US012387555B2

(12) United States Patent
Whidden et al.

(10) Patent No.: US 12,387,555 B2
(45) Date of Patent: Aug. 12, 2025

(54) APPARATUS FOR IMPROVED LIVE TABLE GAME

(71) Applicant: Bad Hare Gaming Inc., Reno, NV (US)

(72) Inventors: Travis Tyson Whidden, Las Vegas, NV (US); Richard Brian Lopez, San Rafael, CA (US); Malcolm Rutherford, Las Vegas, NV (US); Shawn Michael Van Asdale, Reno, NV (US)

(73) Assignee: Bad Hare Gaming Inc., Reno, NV (US)

( * ) Notice: Subject to any disclaimer, the term of this patent is extended or adjusted under 35 U.S.C. 154(b) by 0 days.

(21) Appl. No.: 18/518,210

(22) Filed: Nov. 22, 2023

(65) Prior Publication Data

US 2024/0087404 A1 Mar. 14, 2024

Related U.S. Application Data

(63) Continuation of application No. 18/090,480, filed on Dec. 28, 2022, now abandoned, which is a continuation of application No. 17/391,932, filed on Aug. 2, 2021, now abandoned.

(60) Provisional application No. 63/068,946, filed on Aug. 21, 2020.

(51) Int. Cl.
*G07F 17/32* (2006.01)

(52) U.S. Cl.
CPC ........ *G07F 17/322* (2013.01); *G07F 17/3293* (2013.01)

(58) Field of Classification Search
CPC ........................... G07F 17/322; G07F 17/3293
See application file for complete search history.

(56) References Cited

U.S. PATENT DOCUMENTS

| | | | | |
|---|---|---|---|---|
| 6,039,650 | A | 3/2000 | Hill | |
| 6,709,333 | B1 | 3/2004 | Bradford | |
| 2002/0123376 | A1 | 9/2002 | Walker | |
| 2003/0173737 | A1 * | 9/2003 | Soltys | G07F 17/32 273/149 R |
| 2003/0195025 | A1 | 10/2003 | Hill | |
| 2006/0160608 | A1 * | 7/2006 | Hill | G07F 17/3293 463/25 |
| 2009/0189346 | A1 | 7/2009 | Krenn | |

(Continued)

FOREIGN PATENT DOCUMENTS

WO 2015051312 A1 4/2015

OTHER PUBLICATIONS

How to Play Blackjack, www.https://www.blackjackapprenticeship.com available at «https://web.archive.org/web/20210730195642/https://www.blackjackapprenticeship.com/how-to-play-blackjack/». (Year:2021).

*Primary Examiner* — Werner G Garner
(74) *Attorney, Agent, or Firm* — Van Hoven PC; Stefan D. Osterbur; Joshua Van Hoven

(57) ABSTRACT

A system comprising a camera and a processor is programmed to identify cards dealt at a gaming table. By identifying the cards as they are dealt, the security of the gaming table may be improved. In addition, new betting opportunities may be provided based upon the increased information made available. The system may also be used to directly award prizes to players. The prizes may be awarded in conjunction with or independent of traditional game play.

16 Claims, 7 Drawing Sheets

(56) References Cited

U.S. PATENT DOCUMENTS

| | | | | |
|---|---|---|---|---|
| 2014/0091523 | A1 | 4/2014 | Madding | |
| 2016/0166918 | A1* | 6/2016 | Taft | A63F 1/12<br>273/149 R |
| 2017/0140604 | A1 | 5/2017 | Litman | |
| 2019/0362594 | A1 | 11/2019 | Shigeta | |

* cited by examiner

APPARATUS FOR IMPROVED LIVE TABLE GAME

This application is a continuation of patent application Ser. No. 18/090,480 entitled "Apparatus for Improved Live Table Game" filed on Dec. 28, 2022, which is a continuation of patent application Ser. No. 17/391,932 entitled "Apparatus for Improved Live Table Game" filed on Aug. 2, 2021, which claims priority under 35 U.S.C. 119(e) based on Provisional Application No. 63/068,946, filed Aug. 21, 2020, all of which are hereby incorporated by reference in their entirety.

BACKGROUND OF THE INVENTION

The present invention is an improved apparatus for use on a casino table game, particularly a game that uses playing cards. There are a number of casino table games. Although the traditional games of blackjack and baccarat are the most popular, there are many others such as pai gow, 3 Hand Hold 'Em™, Three Card Poker™, Crazy For Poker™, Ultimate Texas Hold 'Em™ and others. Each of these games is typically played with one or more standard decks of playing cards.

A standard deck of playing cards consists of fifty-two cards divided into four suits—clubs, diamonds, hearts and spades. Each suit consists of thirteen ranked cards designated two through ten, plus jack, queen, king and ace. One or more jokers may also be added to the standard deck. When multiple standard decks are combined, the combination will collectively be referred to as a deck. Some games may add or remove additional cards. For instance Spanish 21, a variant of black jack, removes the tens from the deck. Typically the suits and ranks of the cards that form the deck are known to the players prior to the game beginning.

The basic object of most casino table games is for the player and house (represented by a dealer) to each make a hand. If the house's hand is better than the player's hand, evaluated using a predetermined set of rules, the player typically loses his wager. If the player's hand is better than the house's, the player typically is awarded a prize based on his wager. Wagers may be made before the start of each hand and may be increased or decreased during the play of a hand. In order for the game to be profitable for the casino, the rules have to provide the house with an edge over the player.

Although the cards forming the deck are known to the players, the order in which the cards are arranged in the deck typically is not known. This introduces the element of chance to the game. The order is typically randomized through shuffling. Shuffling may be done by hand typically by a dealer or by a machine. In games where the player makes a strategic decision, the more information the player has about the order of the deck, the better decision the player will be able to make. This in turn will lower the house's edge. Therefore, after the cards are shuffled, the dealer must take care to not let the players gain information about the order of the deck.

Of course, as players see more of the cards in the deck, they naturally learn more about the remainder of the deck. In games such as black jack, several hands or rounds of hands may be played before the deck is reshuffled. As more rounds are played, the players have more information and the house's edge may go down. Players who are paying close attention to the cards played in previous hands of black jack may even be able to use strategies that result in a negative house edge for hands dealt from the deck if the ratios of certain cards changes from the initial standard deck.

This most frequently occurs later in the deck. In situations where the ratio of certain cards is in the players' favor, players may greatly increase the amount of their wagers. Casinos often refer to these players as advantage players and may prohibit their play in order to protect the casino's profits.

Casinos take many steps to prevent players from gaining "unfair" information about the deck. For instance, a cut card may be employed that designates a lower portion of the deck as unusable. Also, the casino may make use of a shoe that holds the deck securely in place, while obscuring the players' view of the cards. As dealers are naturally limited in the number of decks they can hold in their hands at a time (typically no more than two), shoes are most often used in situations where more than one standard deck is used. The shoe may hold as many as eight or more standard decks (i.e., 416 cards). The shoe may be integrated with an automatic shuffler or separate from it. Some shufflers available perform shuffling by capturing a single card and then placing it in a randomly selected position in the deck. At the time the card is captured, it may be held in place for a camera that allows a processor to determine the suit and rank of the card. Shufflers of this type therefore know the entire order of the deck once it is completely shuffled.

In some games, the house's edge in the game is large enough that the player may be awarded a multiple of his wager in certain situations. Players enjoy receiving multiplied returns on their wagers. The house's edge is rarely great enough to support a multiplier of greater than three however, and almost never greater than ten. As the house's edge is increased, the players win much less often and view the game as unfairly weighted to the house's advantage and the game becomes less enjoyable for players. Thus, to provide enjoyable table games, casinos must balance the player's desire to receive a multiplied prize against the player's desire to play a game where the house's edge is perceived as small.

One of the ways casinos achieve the desired balance is to award multipliers based on the probability of the hand made by the players or the house or a combination thereof. The casino may also divide the players' wagers into primary wagers and secondary or side wagers. The multiplier may be paid based on the player's primary wager (typically the wager the player makes that their hand will be better than the house's) or it may be paid on the side wager. The advantage of using a side wager is that higher multipliers may be paid while maintaining the house's edge. For instance, if a five-card stud table game pays even money on a primary wager and the player wins 48% of the time, the house's edge would be 4% (i.e., $1-(2\times0.48)=0.04$). It will be understood by those skilled in the art that if the house's edge is 4%, the return to the player is the remainder from 100%, or 96%. Any additional multiplier payout made on the primary wager would reduce the house's edge further. So if a multiplier were to be paid for a player receiving a royal flush, and only a royal flush, it would be limited to approximately 13,025 to 1 (i.e., 4% of 325,635). As additional hands other than a royal flush are included in the group of hands that award multipliers, the maximum multiplier would be reduced even further. By awarding multipliers on a side wager versus a primary wager, the house is no longer constrained by the 4% edge associated with the primary wager.

With sufficiently rare hands, the casino can also award a player a progressive prize. A progressive prize is generally understood to be a large prize (typically the largest prize available at a given game) with an amount that is increased over time. This is typically done by taking a small portion of each wager made and adding it to the progressive amount. Other progressive prizes may increment solely on the amount of time it takes for a player to win it. Still further, progressive prizes have been suggested that decrease over time or that reset to a minimum value once a maximum value is reached. Typically the progressive prize could only be won by a player at a table game by achieving the rarest hand possible (e.g., a royal flush in five-card stud). To further increase the odds, some casinos have specified additional restraints, such as suit (e.g., a royal flush in spades in the five-card stud game). In such instances, lesser or more commonly occurring hands (e.g., a royal flush in any of the other three suits) may be awarded a small percentage, perhaps 10%, of the progressive. By requiring a rarer hand to win the progressive prize, casinos ensure that the progressive prize will grow for a longer period of time. Players typically are attracted to games with larger progressive prizes. However, it is believed that players also become frustrated if the progressive prize is too difficult to achieve. Therefore, once again casinos are left to find the best balance for a game that is profitable to the casino and enjoyable to the player.

SUMMARY OF THE INVENTION

The present invention details a method and apparatus that improves on the prior art for table game security and deck protection. It also presents new opportunities for wagers that can be added to known table games using the apparatus. Although the preferred embodiment of the invention will be described as it relates to the table game of black jack, it should be understood that it could be applied to any table game.

The apparatus consists of a viewing window over which cards will be passed by a dealer as the cards are dealt from the deck. A high speed video camera is positioned so that the cards are visible to the camera through the viewing window. The camera is operatively attached to a processor having a memory. The processor determines the rank and suit of the cards as they are dealt. Preferably the rank and/or suit of the card is sent to a central server. When cards are dealt from a shoe, the viewing window can be placed in the shoe itself or the viewing window may be part of a cradle designed to hold the shoe. Alternatively, the viewing window may be placed directly in the table top.

By monitoring the cards that have been dealt from the deck, either the processor or the central server can determine if the remaining deck is statistically more favorable to either the house or the player. If the deck reaches a point where there is no longer a house edge, it may alert the casino's personnel to take some action. Typically this action will be to monitor for players placing unusually large bets. Such large bets are indicative of advantage players (aka card counters) and the casino may desire to refuse such player's action. "Count" in this sense should be understood to monitor and track cards that have been played or removed from a deck so that the statistical characteristics of the remaining deck are more accurately known.

Further, by monitoring the cards dealt, the casino may alter the rules of the game in a manner that is predetermined and known to the players in advance. These alterations may be done in order to make the game more attractive and exciting to players while maintaining the house edge. For instance in the game of black jack, a natural black jack (i.e., a player receives an ace a face card, which includes ten's, in their first two cards) may pay 3:2. So if a player's primary wager is $10 and they receive a black jack, they are paid $15. In some casinos, to increase the house edge, the payout is 6:5, so the player wagering $10 receives $12. The odds of being dealt a black jack in the first hand dealt from a deck vary slightly based on the number of decks used. For a single deck game, the odds are 32/663 or approximately 4.827%. For a six deck game, the odds are 576/12,129 or approximately 4.749%. However, these odds may change dramatically as hands are played and cards are dealt from the deck. For instance, in a six deck game with 100 cards remaining in the deck consisting of two aces and eight face cards, the odds of being dealt blackjack are 8/2,475 or approximately 0.323%. Therefore, rather than paying 3:2, the casino could profitably pay much more, perhaps 30:2. Now the player wagering $10 could be paid $150. The processor of the present invention could calculate these payouts dynamically and publish the payouts for various hands on an associated screen that may be visible to the players.

In addition to altering payouts made on a primary wager, the present invention lends itself to making side wagers that can be easily added to any game. And, as in the black jack example, the payout of the side wager may be dynamically calculated based on the cards remaining in the deck. The present invention may also trigger payouts directly. For instance, the processor may determine that dealing the eight of spades will trigger a bonus on any active side wager. The bonus may be determined by the suit or rank of the card following the trigger card. In such an embodiment, the processor, through its associated screen, could inform the dealer and players when a side bet wager is to be paid as well as the amount of the payment.

DETAILED DESCRIPTION OF THE PREFERRED EMBODIMENTS

Figure 1:
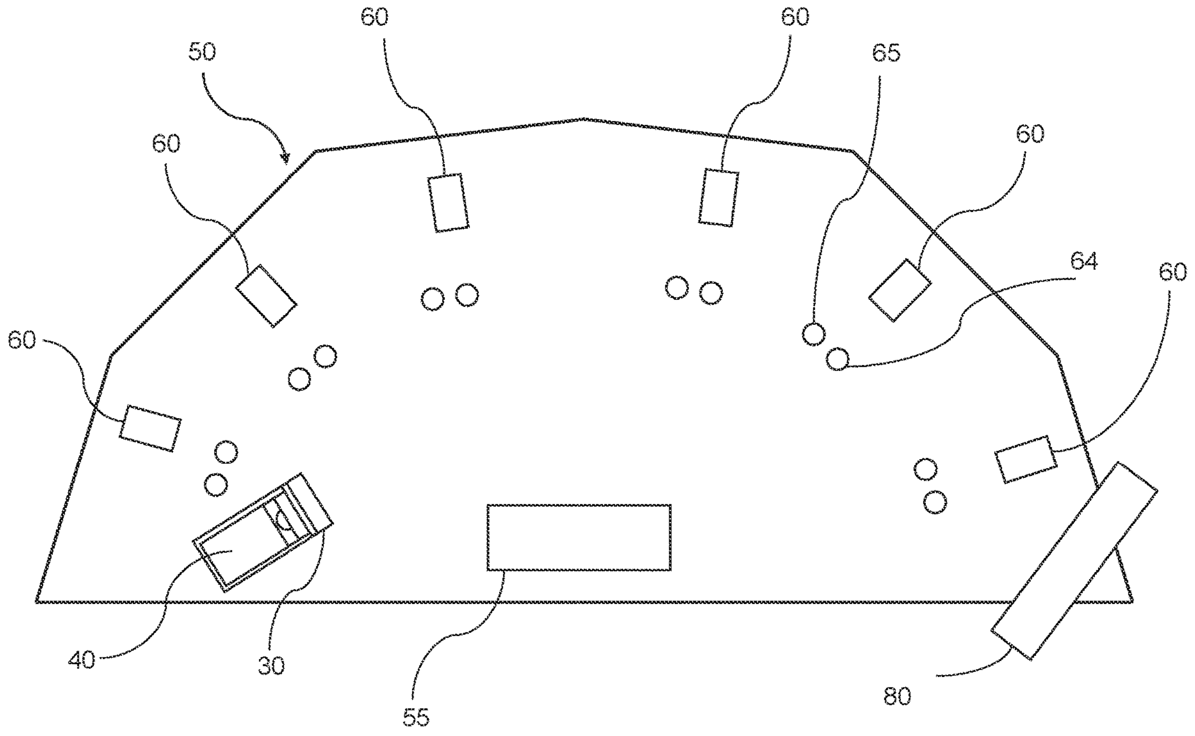
FIG. 1 is a first table layout that may be used for implementing the present invention on a black jack table game.

One embodiment of the present invention may utilize a gaming table 50 as shown in FIG. 1. The layout for table 50 is designed to accommodate a black jack game. A dealer employed by the casino stands behind the table 50 with access to a tray 55. The tray 55 holds chips of various denominations used to pay out players' winning wagers. Each player sits at the table 50 behind a player position 60. Each player position 60 also has an associated primary wager circle 64. Each player position 60 may also have an associated secondary wager circle 65 where players place their secondary wagers on the hand. The table 50 may also be equipped with a video display 80. The video display 80 is used to display information to the players.

Play of the game begins by each player placing a wager in the primary wager circles 64 of their player position 60. The players may also place a wager in the secondary wager circles 65 of their player position 60. In the preferred embodiment, the secondary wager is voluntary and the primary wager is mandatory. However, in alternative embodiments the secondary wager may be mandatory. Once all of the wagers have been placed, the dealer deals two cards face up from a shoe 40 to at least each occupied player position 60. The shoe 40 is held by a cradle 30 and may hold up to eight decks of cards. The dealer also deals two cards from the shoe 40 to themselves, one face up and one face down. The players then examine their cards and decide if they want an additional card or if they will stand. If they chose an additional card, the dealer will deliver it from the shoe 40.

Figure 2A:
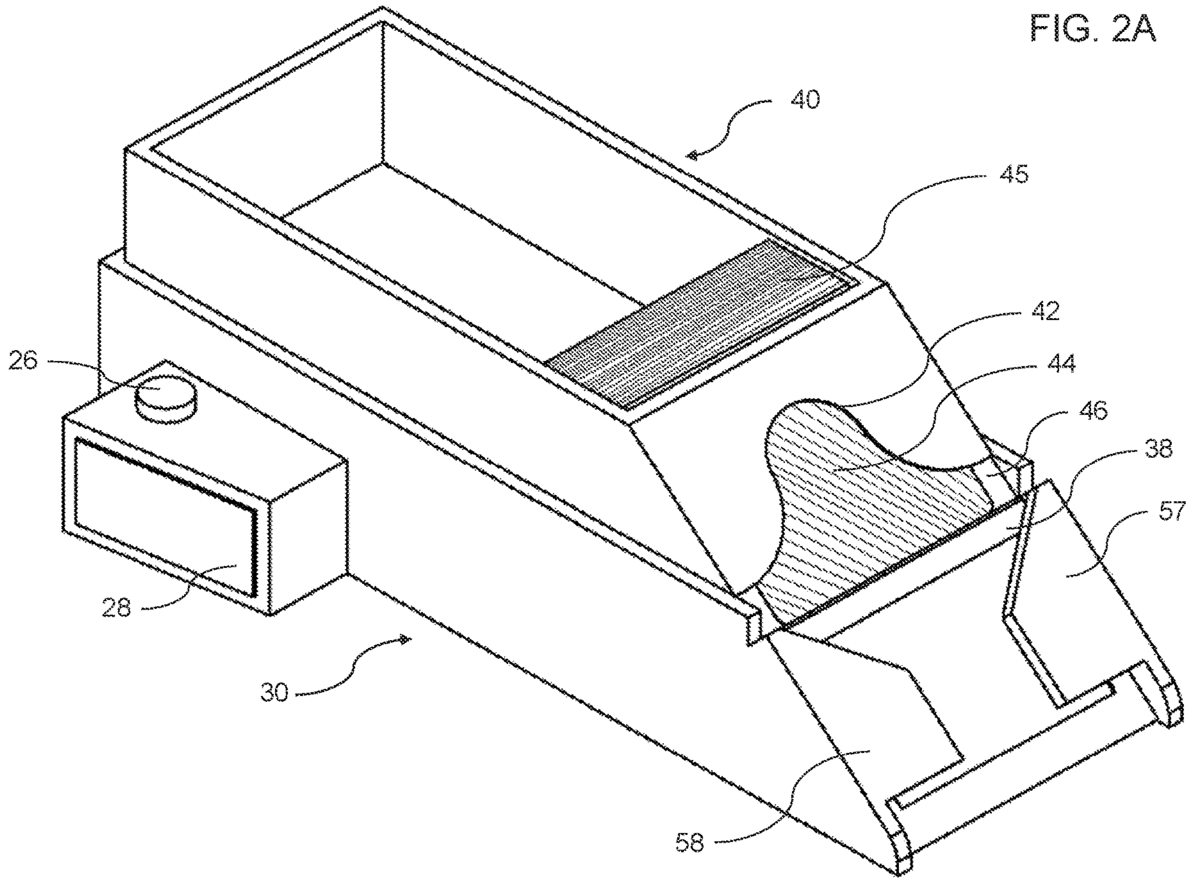
FIG. 2A is perspective view of a cradle incorporating the present invention with a shoe inserted.
Figure 2B:
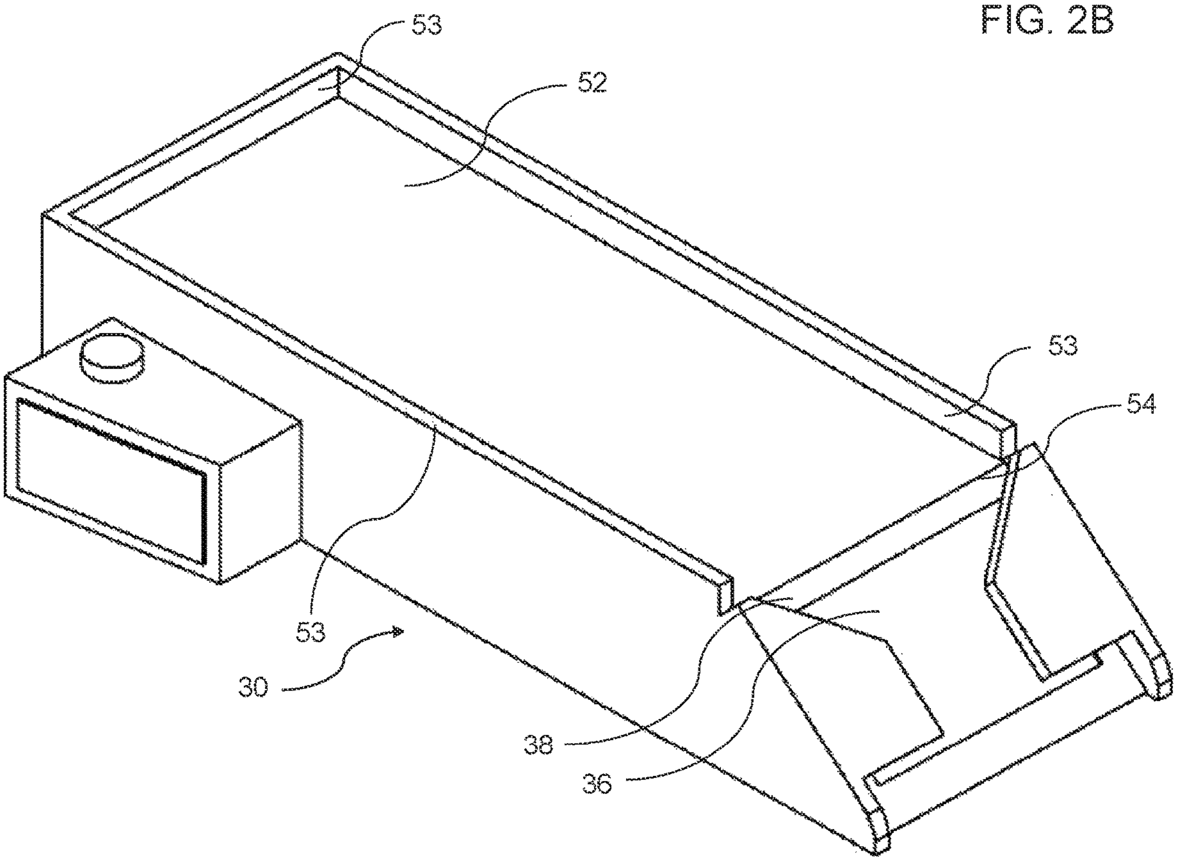
FIG. 2B is perspective view of a cradle incorporating the present invention without a shoe inserted.
Figure 3:
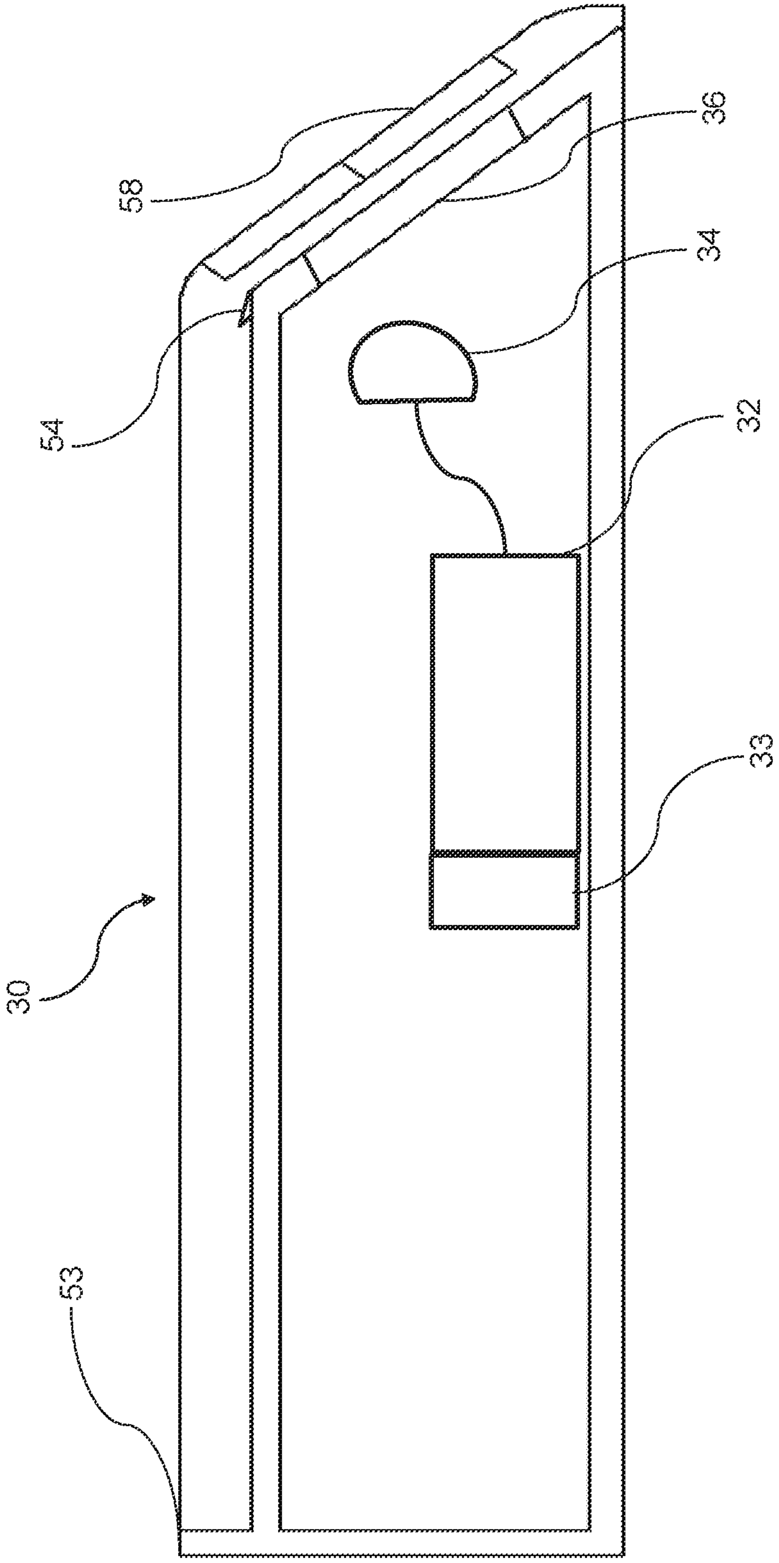
FIG. 3 is a cut-away side view of a cradle incorporating the present invention.

The operation of the shoe 40 and the cradle 30 will be further understood by examining FIGS. 2A and 2B. The shoe 40 has an opening 42 that allows the dealer to retrieve a top card 44 from a deck of cards 45 by sliding the top card 44 down a shoe ramp 46. The shoe ramp 46 meets a cradle ramp 38 at its distal end. Preferably the cradle ramp 38 has a small lip 54 at the top that prevents the shoe 40 from moving forward. The body of the cradle 30 may have one or more retaining walls 53 that also hold the shoe 40 firmly in place as well as a top surface 52 for supporting the shoe 40. The cradle ramp 38 includes a viewing window 36. A high-speed video camera 34 as shown in FIG. 3 is positioned behind the viewing window 36 so that the face of the card 44 is briefly visible as the dealer pulls the card across the viewing window 36. Using a camera 34 such as CMT-120FPS-OV9281-C411 with a wide angle lens and a global shutter sixty frames per second can be captured at a resolution of 352×240. This assures that even a dealer pulling cards quickly across the window 36 will capture several partial images of the card 44.

As seen in FIG. 3, the camera 34 is in communication with a processor 32 and an associated memory 33. The memory 33 permanently stores a program (not shown) executed by the processor 32 as well as pre-loaded images of the cards used in the deck. The memory 33 also temporarily stores images capture by the camera 34. The program 31 monitors the images produced by the camera 34 to determine when a card 44 has been pulled and moves past the window 36. A left flap 57 may be installed so that, absent a card, the camera 34 may be installed on the left wall of the cradle and has a static known background in its field of view. Having a fixed known background may aid the processor 32 to detect a card being drawn across the viewing window 36. A right flap 58 may be installed to prevent a dealer from pulling a card from the shoe ramp 46 directly to him before the card proceeds down the cradle ramp 38 and across the viewing window 36. Alternatively, a raised lip or similar obstruction may be used.

Once the program determines that a card 44 has been pulled, it utilizes a neural network form of artificial intelligence to examine the various images of the card 44 captured as it moved across the window 36. The processor 32 passes the temporary images captured by the camera 34 through the pre-trained neural network to determine the suit and rank of the card 44. The output value of the neural network is the prediction for each temporary image, even though there may be several temporary images for a single card 44. Some of the temporary images may not be clear enough for the program to make a high confidence prediction. If so, that image may be ignored. The neural network is trained with hundreds of thousands of computer generated variations of playing card rank and suit from several different card decks. Each generated image may have a slightly different angle, blur, lighting or visual obstruction to generate the best prediction model. Generally, the more variations of training images used, the higher the confidence prediction will be.

Once the rank and suit of the card 44 has been determined by the processor 32, the processor may send the data to a remote server (not shown). The remote server may be located in the casino's security offices. The processor 32 and the remote server are connected via a network pathway. Network pathway may comprise an Internet connection, a wired or wireless local area network (LAN) or a wide area network (WAN). Further, it may include additional servers, switches, data busses and other networking hardware for relaying the required data. By providing the casino's security personnel with data related to the cards dealt and therefore the cards remaining in the deck, security can monitor the game for cheating or advantage players.

In an alternative embodiment, the pre-loaded images may be stored in a memory associated directly with the remote server. In this scenario, the remote server uses a neural network program to determine the suit and rank of the card 44. The processor 32 merely transmits the images captured by the camera 34 over the network pathway 90 to the remote server.

In either embodiment, the pre-loaded images, the temporary images and the determination of suit and rank is preferably encrypted, as is all transmissions between the processor 32 and the remote server. The encryption prevents a player from illegally accessing the data and using it to cheat. As an additional security measure, the determination of suit and rank may be delayed by the processor 32 for several seconds or even minutes so that by the time the determination is made, the hand is over.

The cradle 30 may also include a small output device such as a small screen 28 intended for use only by casino personnel. The small screen 28 is preferably under control of the processor 32 and typically indicates the state of the cradle 30, for example "ready" or "error." This information could also be communicated using color coded LEDs or the like. The small screen 28 may also be used during the initial set up of the cradle to display information such as the IP address of the cradle 30, the number of the table 50 (e.g., BJ-10) or the number of decks placed in the shoe. The cradle also may include one or more input devices such as a button 26. During regular use, the dealer may press the button 26 to indicate that a fresh deck has been placed in the shoe 40. During the setup of the cradle 30, the button 26 may be used to set various parameters shown on a menu on the small screen 28. Alternatively, these parameters may be viewed and set using a network interface accessed at the remote server or some other authorized access point.

Figure 4A:
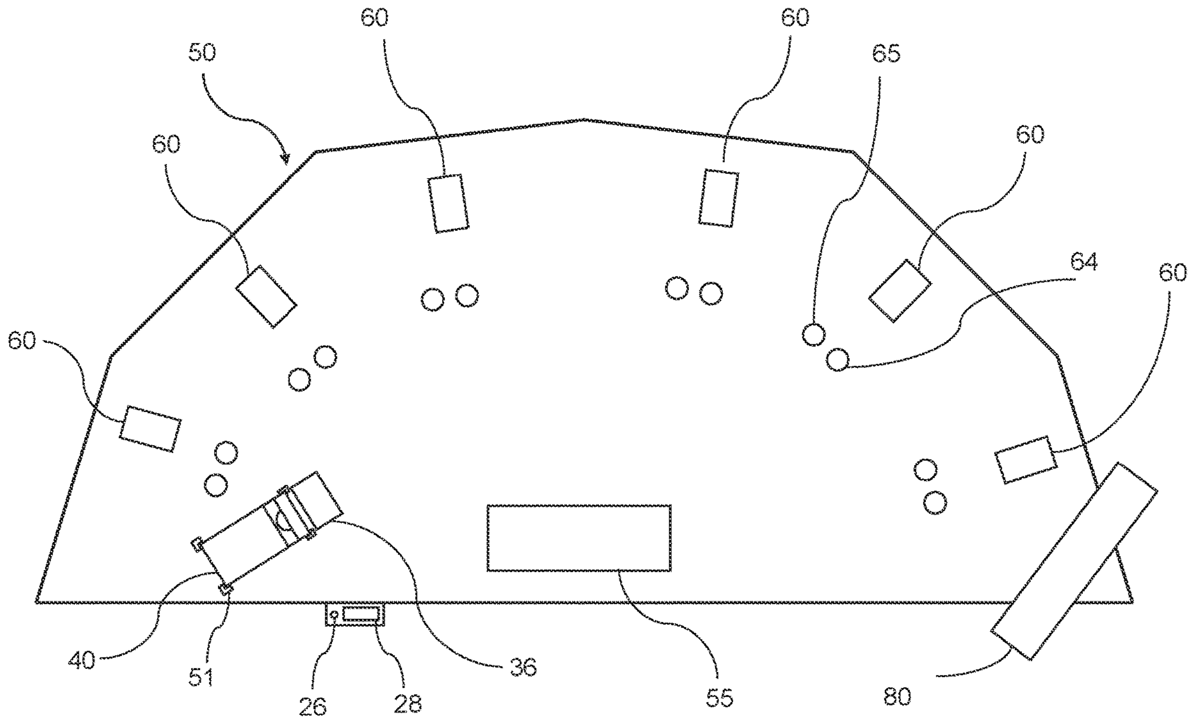
FIG. 4A is an alternative embodiment of the present invention where the viewing window is located on the table's surface adjacent to a shoe.

Referring now to FIG. 4A an alternative embodiment of the present invention will now be discussed. Again the cards are dealt out of the shoe 40. However, the only component of the cradle 30 that is visible from the level of the table 50 is the viewing window 36. The small screen 28 and the button 26 have been moved to the back side of the table 50 so as to be easily accessed by the dealer. The remaining components of the cradle 30 are located either below the table 50 surface or remotely. The shoe 40 is positioned so that the shoe ramp 46 is adjacent to the viewing window 36 such that when the dealer draws the top card 44 it will naturally pass over the viewing window 36. To ensure that the shoe 40 remains in the proper relative position to the viewing window 36, one or more feet 51 may be placed on the table 50 surface to hold the shoe 40 in place. Alternative means such as one or more magnets or slots and grooves may be used to keep the shoe 40 in place.

Figure 4B:
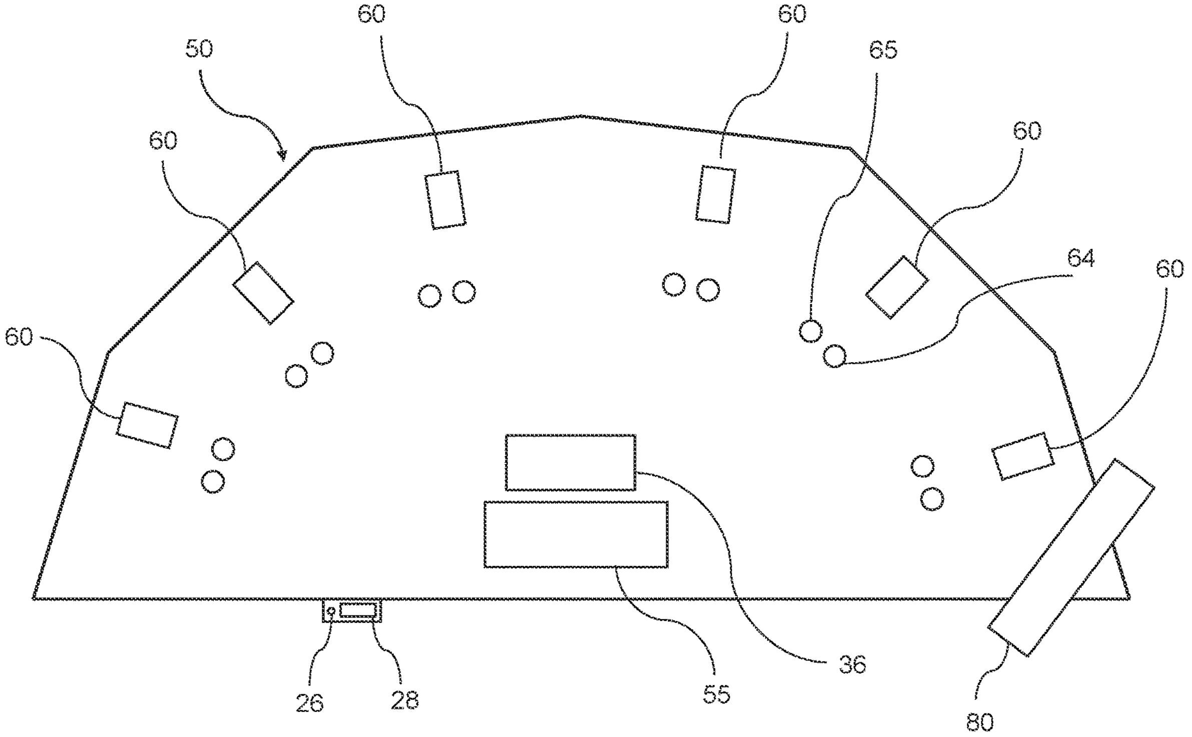
FIG. 4B is an alternative embodiment of the present invention where the viewing window is located on the table's surface directly below the point where the dealer may hold a deck of cards

Referring now to FIG. 4B another alternative embodiment of the present invention will be discussed. Unlike the prior embodiments, this embodiment does not use a shoe. Instead, the dealer holds the deck in his hand. The viewing window 36 is slightly larger and is placed directly below where the dealer would naturally hold the deck over the surface of the table 50. In this embodiment the processor 32 would use the camera 34 to capture images of dealt cards as the dealer pulls them off of the deck in his hand over the viewing window 36. The processor 36 may also monitor to determine if the deck is no longer being held over the viewing window 36 and issue an audible or visual alarm to remind the dealer to properly position the deck.

In the previously discussed embodiments, the processor 32 may be used to monitor the count of the remaining deck. When the deck count reaches a determined point the processor 32 or central server may notify casino personnel that the deck is prone to advantage players as described in U.S. Pat. No. 9,514,614 issued to eConnect, Inc. and incorporated herein by reference.

In addition to counting cards dealt so that players may experience an advantage playing the remaining portion of the deck, players may also be able to use this information to their advantage when playing a freshly shuffled deck through a method known as shuffle tracking. Shuffle tracking is a technique that is used when a large deck is hand shuffled by a dealer. Because a deck with much more than 104 cards cannot be shuffled by a person all at once, the dealer must break down large decks, such as 312 card six-deck decks into smaller units. Depending on the methodologies used to shuffle this deck, it may be vulnerable to exploitation. For example, a six-deck deck may be shuffled by separating the deck into six approximately equal piles, arbitrarily denoted A through F. Each pile will be approximately fifty-two cards tall. Casinos typically want a standard policy for shuffling. This policy may dictate, for instance, that pile A is mixed with pile D and shuffled. Then pile B is mixed with pile E and shuffled and stacked on the combined A-D pile. Then pile C is mixed with pile F and shuffled and stacked on the A-D and B-E combined pile.

The problem occurs when an observant player knows from the prior games that certain piles have a count that is advantageous. For instance, if A had a plus two count and D had a plus four count, the combined pile of A-D would have a plus six count and could be played as having a plus three "true" count (the average of A and D for two fifty-two card decks). If the A-D pile is placed at the beginning of the deck, the player may play the first hundred cards or so as having a plus three count before the first card is even exposed. However, the present invention may be used to counter this practice as well. Rather than having a fixed procedure for mixing the piles A-D, B-E and C-F, the processor 32 can calculate the approximate count of each pile as the hands are dealt. Once it is time for a hand shuffle of the entire deck, the processor 32 can determine the optimum pile mixing routine for a balanced new deck. This routine may be displayed to the dealer using the small screen 28. An example of how this may work in practice is shown in Table 1 below:

TABLE 1

| SHUFFLE TRACKING NEUTRALIZED | | | | | |
|---|---|---|---|---|---|
| PILE | PILE COUNT | STANDARD COMBO | STANDARD COUNT | REVISED COMBO | REVISED COUNT |
| A | +2 | A + D | +2 + 4 = + 6 | A + E | +2 − 2 = 0 |
| B | −3 | B + E | −3 − 2 = −5 | B + F | −3 + 3 = 0 |
| C | −4 | C + F | −4 + 3 = −1 | C + D | −4 + 4 = 0 |
| D | +4 | | | | |
| E | −2 | | | | |
| F | +3 | | | | |

As demonstrated in Table 1, an unbalanced deck and the possibility of shuffle tracking can be eliminated or minimized often by simply altering the procedures used for a standard hand shuffle. There may be other instances where this is not possible. For instance, if pile A has a +5 count and every other pile has a −1 count, every combination of two piles with A in it will have a +4 count (+2 true count) and all the other combinations of piles will have a −2 count (−1 true count). In such a situation, the processor 32 may alert the dealer that pile A needs to be split up and redistributed amongst some of the remain piles before continuing.

In addition to using the data provided by the processor 32 to enhance security, casinos and game designers may desire to use the data to provide new and exciting wagering opportunities. In such an embodiment, the invention may actually aid players in counting the cards from the deck while maintaining the desired house's edge. This may be accomplished by altering the rules and/or payouts of the game in question as the count varies.

Again using black jack as an example there are a variety of rules that may be employed to alter the house edge. In a "standard rules" game of blackjack using a deck made up of six standard 52-card decks (for a total of 312 cards) the house edge against a player playing an optimal strategy is 0.5%. The standard rules require: The dealer stands on all 17s. The player may double down on any combination of his first two cards. The player may double down after splitting pairs. A blackjack pays 3 to 2 and insurance pays 2 to 1. In addition to these standard rules, there are several common rules or exceptions that casinos may employ to increase their edge. These common rules and the effect on house edge are as follows:

Black jack pays 6 to 5 (+1.45%)

Dealer hits soft 17 (+0.2%)

Double down on 9-11 only (+0.09%)

Double down on 10 or 11 only (+0.22%) No double after splitting pairs (+0.13%)

By monitoring the count, an advantage player may identify a situation where the house edge has changed from +0.5% to −1.0% for the next hand. However, utilizing the present invention, the casino could change the rules for the next hand by changing the payout for blackjack from 3 to 2 (standard rules) to 6 to 5. This rule change would result in the house edge being +0.45% (i.e. −1.0+1.45=0.45). If the casino deems 0.45% to be too little edge, a second rule limiting the players' ability to double down to only two cards adding up to 9 to 11 (+0.09%), would return the house edge to 0.54%. Thus, although the advantage player has accurately counted the cards and identified what would normally be a profitable situation, she is not able to capitalize on it by increasing her bet on the next hand because the rules have changed accordingly. The rules changes listed above are merely exemplary and are not limiting. Any number of additional rules may be added.

Figure 5:
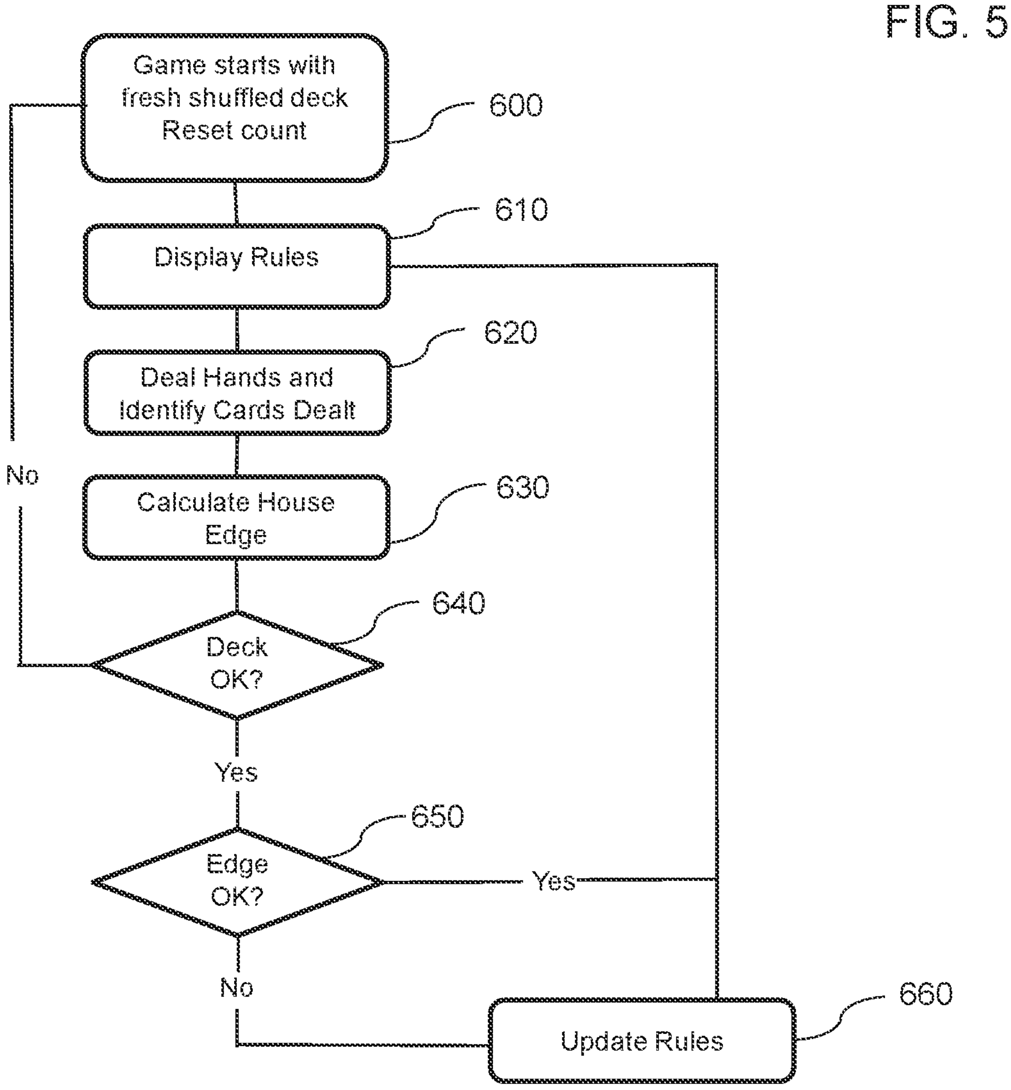
FIG. 5 is logic diagram for an alternative embodiment of the present invention where the rules of a standard game are adjusted between hands to maintain a desired house edge.

In this embodiment, the processor 32 would broadcast the rule changes to the video display 80. In addition, because there is no longer a danger of the casino losing to advantage players, the processor 32 may also publish a dealt card history or count to the video display 80. The logic used by the processor 32 to adjust the rules is more clearly demonstrated by the flow chart in FIG. 5.

The game starts at step 600 when a new deck is shuffled and preferably placed in the shoe 40. At step 610 the processor 32 publishes what the casino has set as the rules for the game by sending a signal to video display 80. Once players have placed their bets for the next hand, the dealer deals the cards and the processor 32 identifies the cards as they are drawn across the viewing window 36 at step 620. The hands are completed and the dealer makes the appropriate pay outs. At step 630 the processor 32 calculates the house edge for the next hand based on the cards identified in step 620 for all hands dealt since a new deck was introduced at step 600.

At step 640 the processor 32 determines if the deck meets the casino's specified standards to deal another hand. If the deck does not meet the standards, the processor 32 may indicate that no more additional hands will be dealt from the deck by sending a signal to video display 80, small screen 28, and/or a speaker 50.

The standards to approve the deck may simply be a minimum number of cards remaining. Prior to the present invention, the dealer would insert a "cut card" randomly in the rearward portion of the deck. The cut card would typically be a bright rectangular piece of plastic the same size as the playing cards in the deck. When the cut card was pulled from the shoe or otherwise dealt, it would serve to indicate the last hand dealt from the deck. With the present invention, the cut card can still be used or can be eliminated altogether. Where a cut card is still used, the processor 32 may recognize the cut card and automatically prepare for the insertion of a fresh deck into the shoe 40. The processor 32 may be programmed to approve the deck at step 640 for so long as X cards remain, where X is either pre-programmed or selected during the set-up of the cradle 30. Alternatively, the processor 32 may randomly select a number X between numbers Y and Z, where Y and Z are either pre-programmed or selected during the set-up of the cradle 30. The random selection between Y and Z may be weighted toward either Y or Z. This would mimic the prior usage of a cut card.

The determination at step 640 may also take into account the count of the deck. In this manner, the casino may allow the deck to continue in play for so long as the count is not too favorable to the player. This may result in more hands being dealt per deck, which translates into less time spent shuffling, which translates into more hands dealt per hour. This is generally considered advantageous to the casino.

At step 650 the processor 32 determines if the minimum desired house edge is still maintained based on the updated deck count. If the house edge meets the minimum, no change to the displayed rules is necessary and play may proceed directly to step 620. If the house edge does not meet the minimum, the processor 32 updates the rules at step 660. The processor 32 then may display the new rules at step 610. The processor 32 may wait for an indication that a new hand has started, such as a button press by the dealer or some other indicator, before showing players the new rules. This process will continue until the deck no longer meets the minimum standards at step 640 and a new deck is introduced to play.

Although the foregoing example dealt with changing the rules of the game to affect the expected value of a primary wager, the present invention can also be used to offer secondary wagering opportunities. In this manner, side wagers with payout ratios larger than what is possible with prior art games may be offered.

As an example, consider a black jack side bet, Diamonds and Deuces. The rules are simple. The player places a secondary wager in the secondary wager circle 65 prior to the deal of the hand. If the player receives one or more deuces in their first two cards, they are paid out according to the following "standard" pay table, used when the deck is new and is composed of six 52-card decks, or 312 cards.

TABLE 2

STANDARD PAY TABLE

| PLAYER | DEALER | PROBABILITY | $1 PAYS | RETURN |
|---|---|---|---|---|
| Two 2 of Diamonds | Black Jack in Diamonds | 9.29562E−07 | Progressive | 0.092957178 |
| Two 2 of Diamonds | Suited Black Jack | 2.78869E−06 | 2001 | 0.005580164 |
| Two 2 of Diamonds | Unsuited Black Jack | 1.11547E−05 | 501 | 0.00558853 |
| Two 2 of Diamonds | Any | 0.000294303 | 126 | 0.037082223 |
| 2 Suited 2s | Any | 0.000927529 | 21 | 0.01947811 |
| 2 Offsuit 2s | Any | 0.00445214 | 11 | 0.048973535 |
| One 2 of Diamond | Any | 0.035617116 | 9 | 0.320554044 |
| One 2, non-Diamond | Any | 0.106851348 | 4 | 0.427405392 |
| All other | Any | 0.851842691 | 0 | |
| | | 1.00000 | | 0.957619174 |

As described in the pay table, the side bet has an expected return of 95.76%, or a house edge of 4.24%. The Progressive prize in the pay table has an average value of $100,000.

However, this pay table may be adjusted by the processor 32 and displayed on the video display 80 during step 670. Therefore, for a hypothetical hand that starts exactly half way through the deck (i.e., 156 cards) where there is only two 2 of Diamonds remaining in the deck and three of all other relevant cards of identical rank and suit, the following pay table may be displayed:

TABLE 3

| POOR DECK PAY TABLE | | | | |
|---|---|---|---|---|
| PLAYER | DEALER | PROBABILITY | $1 PAYS | RETURN |
| Two 2 of Diamonds | Black Jack in Diamonds | 2.52752E−07 | Progressive | 0.02527542 |
| Two 2 of Diamonds | Suited Black Jack | 7.58255E−07 | Progressive | 0.075826261 |
| Two 2 of Diamonds | Unsuited Black Jack | 3.03302E−06 | 20,001 | 0.060663435 |
| Two 2 of Diamonds | Any | 7.8669E−05 | 1,001 | 0.078747628 |
| 2 Suited 2s | Any | 0.000744417 | 21 | 0.015632754 |
| 2 Offsuit 2s | Any | 0.003722084 | 11 | 0.040942928 |
| One 2 of Diamond | Any | 0.023986766 | 9 | 0.215880893 |
| One 2, non-Diamond | Any | 0.107940447 | 4 | 0.431761787 |
| All other | Any | 0.863523573 | 0 | 0 |
| | | 1.00000 | | 0.944731107 |

As seen, the removal of just one Two of Diamonds makes the high value winning hands much more difficult to achieve. As a result, the players can be offered much greater prizes for achieving certain hands while actually increasing the house edge from 4.24% to 5.52%. Of particular note is that the player now may win the Progressive for having two Two of Diamonds anytime the dealer has a suited black jack, even if the suit is not diamonds.

However, if instead of two Two of Diamonds, there are four Two of Diamonds in the deck when the halfway hand is dealt, the following pay table may be used:

TABLE 4

| RICH DECK PAY TABLE | | | | |
|---|---|---|---|---|
| PLAYER | DEALER | PROBABILITY | $1 PAYS | RETURN |
| Two 2 of Diamonds | Black Jack in Diamonds | 1.51651E−06 | Progressive | 0.151652522 |
| Two 2 of Diamonds | Suited Black Jack | 4.54953E−06 | 201 | 0.000914456 |
| Two 2 of Diamonds | Unsuited Black Jack | 1.81981E−05 | 51 | 0.000928104 |
| Two 2 of Diamonds | Any | 0.000472014 | 26 | 0.012272358 |
| 2 Suited 2s | Any | 0.000744417 | 21 | 0.015632754 |
| 2 Offsuit 2s | Any | 0.005210918 | 11 | 0.057320099 |
| One 2 of Diamond | Any | 0.047311828 | 6 | 0.283870968 |
| One 2, non-Diamond | Any | 0.106451613 | 4 | 0.425806452 |
| All other | Any | 0.839784946 | 0 | 0 |
| | | 1.00000 | | 0.948397712 |

As demonstrated, the presence of the extra Two of Diamonds makes it much more likely that the player will achieve a payout, even the Progressive. As a result, the value of certain pay outs had to be reduced in order for the house edge to remain relatively unchanged at 5.16%. These calculations may be made by the processor 32 at step 660.

In instances where a progressive may be awarded or where certain outcomes trigger a secondary or bonus game, as described in U.S. Pat. No. 9,662,563, incorporated herein by reference, it may be desirable to adjust the operation of the secondary or bonus game such that the average value awarded from the secondary or bonus game is altered. Such adjustments may be preferable because they are less perceptible to the player in situations where high value hands are easier than normal to achieve. Conversely, if a hand that was previously ineligible for the Progressive prize becomes eligible, players will generally take notice and have a heightened sense of excitement.

In addition to using data generated by the processor 32 to alter payouts for main games and bonus games, the processor 32 may be used to trigger a bonus. In one embodiment, the processor 32 may randomly select two cards from the deck, any time these two cards are dealt within X cards of each other, each player placing a wager may receive a payout. The present invention may also be used to provide non-monetary bonuses such as free meals, rooms, comps, etc. These may be paid as the result of a specific wager or without the requirement of a wager. The number X is chosen so that the mystery payouts occur at the desired frequency. The two cards used as the trigger may be shown to the players on video screen 80 or they may remain unknown. Variations are easily imagined, such as selecting three cards or a random number of cards. The number X may be randomly chosen as well. Once the trigger condition is met, the processor 32 would alert the dealer and players through the video screen 80 and/or the speaker 50 or any other desired celebratory alarm.

The present invention may also be used to monitor the skill level, betting patterns and speed of play of the respective players at the table. A casino may use this information to refine their player tracking data and player rewards systems. For instance, two players may place identical bets, but may differ in how much the casino desires each players' play. Player A takes ten seconds to make every decision and plays at 99% of theoretically optimal. Player B takes two seconds to make every decision and plays at 80% of theoretically optimal. For obvious reasons, the casino may desire to give player B additional loyalty rewards, comps and other perks. The processor 32 may make use of artificial intelligence to determine which players are likely requesting cards as cards are dealt by the dealer. Additionally, an overhead camera (not shown) effectively in communication with the processor 32 may also be added to the equipment already described to ensure that accurate measurements are being taken.

Other combinations, orders of operation, additions and modifications to the foregoing may also be made without departing from the scope of the present invention. Thus, the foregoing should be considered illustrative rather than limiting the invention, which is defined only by the following claims.

The invention claimed is:

1. A device for determining data of a playing card for a casino table game, the casino table game including a plurality of playing cards, the device comprising:
a. a window having a front surface and a back surface, the window adjacent to a shoe carrying the plurality of playing cards;
b. an image capture device having a line of sight from the back surface of the window to the playing card passing over the front surface upon independently distributing the playing card during the casino table game;
c. wherein the image capture device is in communication with a processor and a memory, the processor is operatively connected to the memory, and the memory stores processor-executable instructions for:
d. detecting the playing card when at least a portion of the playing card is in the line of sight of the image capture device,
e. in response to detecting the playing card, capturing an image of the playing card,
f. determining one or more of a suit, a rank, or a numerical attribute of the playing card based on the image and
g. a cradle, the cradle shaped to receive at least a portion of the shoe, the cradle having a housing, and the housing comprising a top housing surface and the window, wherein the image capture device is within the cradle.

2. The device of claim 1, wherein the processor is located within the housing.

3. The device of claim 1, wherein the instruction for determining the one or more of a suit, a rank, or a numerical attribute of the playing card based on the image includes using a neural network to evaluate the image of the playing card.

4. The device of claim 3, wherein the memory stores further processor-executable instructions for:
h. in response to detecting the playing card, capturing a plurality of images of the playing card as it traverses the front surface, and
i. determining the one or more of the suit, the rank or the numerical attribute of the playing card based on the plurality of images.

5. The device of claim 4, wherein the instruction for determining the one or more of a suit, a rank, or a numerical attribute of the playing card based on the image further includes passing the plurality of images through a pre-trained neural network to determine the suit and the rank of the card.

6. The device of claim 5, wherein the pre-trained neural network includes a plurality of nodes trained with a plurality of computer generated variations of the suit and the rank from several different card decks.

7. The device of claim 5, wherein the pre-trained neural network uses an output value to predict the image of the playing card.

8. The device of claim 1, further comprising instructions for remotely storing the image of the playing card.

9. The device of claim 1, wherein the cradle comprises a cradle ramp configured to be positioned adjacent an opening of the shoe, wherein the window is the cradle ramp; and wherein the cradle ramp comprises a cradle lip configured to prevent the shoe from moving forward relative to the cradle when the shoe is supported in the cradle.

10. A device for generating data of a playing card for a casino table game, the casino table game including a shoe carrying a plurality of playing cards, one or more of the plurality of playing cards being independently distributed from a ramp of the shoe, the device comprising:
a. a housing shaped to secure the shoe on the housing;
b. a window carried by the housing, the window having a front surface and a back surface, the window adjacent to the shoe when the shoe is secured to the housing;
c. a guide flap on the window, the guide flap configured to direct each one of the plurality of playing cards across the window while the playing card is independently distributed from the ramp of the shoe;
d. a camera carried within the housing, the camera having a line of sight from the back surface of the window to the playing card while the playing card is independently distributed over the front surface of the window from the ramp of the shoe;
e. wherein, the camera is in communication with a processor and a memory, the processor is operatively connected to the memory, and the memory stores processor-executable instructions for:
f. detecting the playing card when the playing card is in the line of sight of the camera,
g. in response to detecting the playing card, capturing at least one image of the playing card,
h. determining one or more of a suit, a rank, or a numerical attribute of the playing card based on the at least one image; and
i. a cradle, the cradle shaped to receive at least a portion of the shoe, the cradle defining the housing, and the housing comprising a top housing surface and the window wherein the camera is within the cradle.

11. The device of claim 10, wherein the instruction for determining the one or more of a suit, a rank, or a numerical attribute of the playing card based on the image includes using a neural network to evaluate the image of the playing card.

12. The device of claim 11, wherein the memory stores further processor-executable instructions for:
j. in response to detecting the playing card, capturing a plurality of images of the playing card as it traverses the front surface, and
k. determining the one or more of the suit, the rank or the numerical attribute of the playing card based on the plurality of images.

13. The device of claim 10, wherein the processor is located within the housing.

14. The device of claim 10, wherein the instruction for determining the one or more of a suit, a rank, or a numerical attribute of the playing card based on the image further includes:
j. passing the plurality of images through a pre-trained neural network to determine the suit and rank of the card, wherein the pre-trained neural network uses an output value to predict the image of the playing card that includes one or more of a suit, a rank, or a numerical attribute, and wherein the pre-trained neural network includes a plurality of nodes trained with a plurality of computer generated variations of the suit and the rank from several different card decks.

15. The device of claim 10, further comprising instructions for remotely storing the image of the playing card.

16. The device of claim 10, wherein the cradle comprises a cradle ramp configured to be positioned adjacent an opening of the shoe, wherein the window is the cradle ramp; and wherein the cradle ramp comprises a cradle lip configured to prevent the shoe from moving forward relative to the cradle when the shoe is supported in the cradle.

* * * * *